Apr. 10, 1923.
J. C. BOYLE
1,451,488
FORD BRAKE CLUTCH CONNECTOR
Filed Oct. 5, 1921
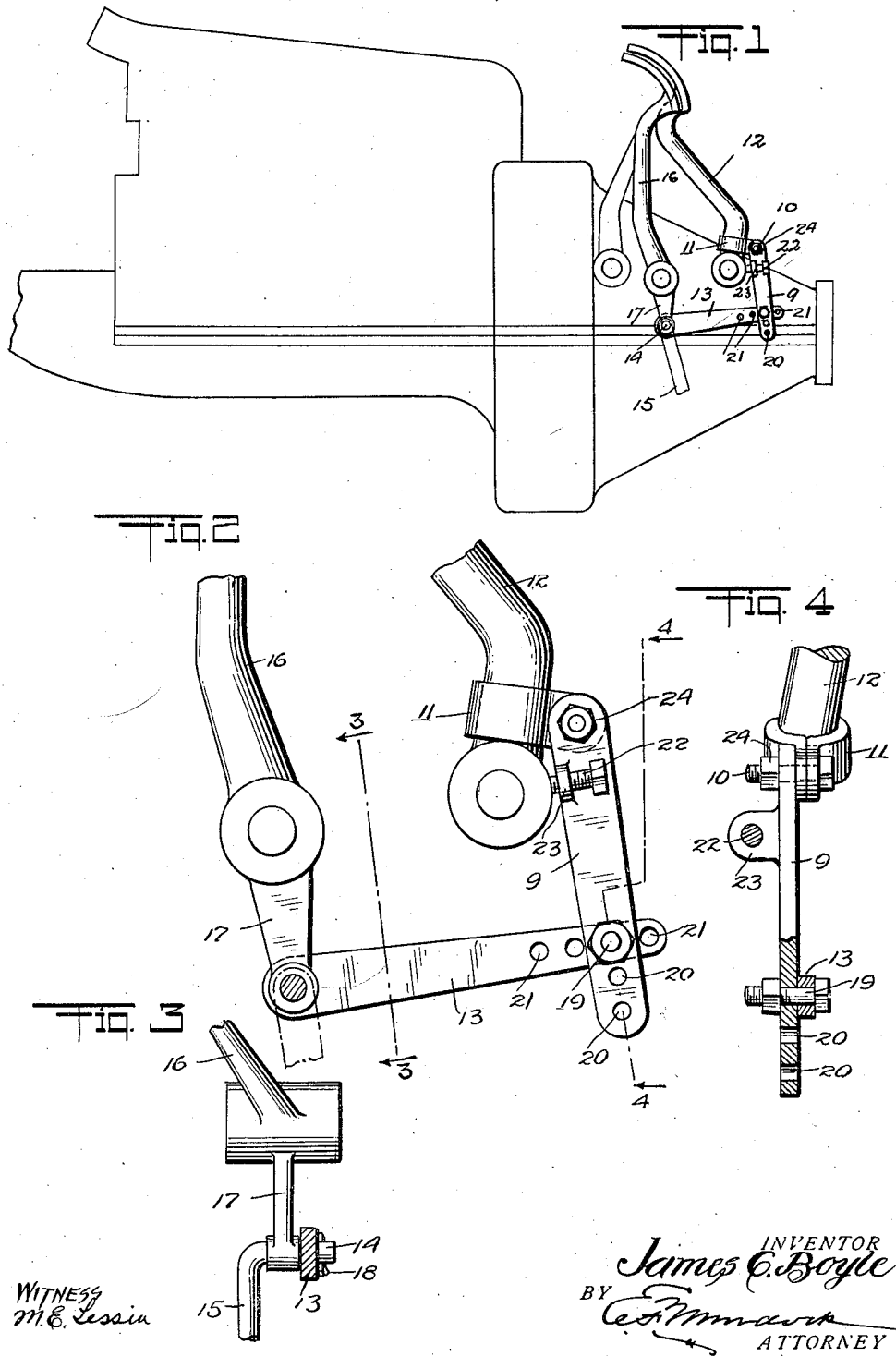
WITNESS
M. E. Lessin
INVENTOR
James C. Boyle
BY
ATTORNEY Patented Apr. 10, 1923.

1,451,488

UNITED STATES PATENT OFFICE.

JAMES C. BOYLE, OF FLINT, MICHIGAN.

FORD BRAKE-CLUTCH CONNECTOR.

Application filed October 5, 1921. Serial No. 505,661.

*To all whom it may concern:*

Be it known that I, JAMES C. BOYLE, a citizen of the United States, and a resident of Flint, in the county of Genesee and State of Michigan, have invented certain new and useful Improvements in Ford Brake-Clutch Connectors, of which the following is a full, clear, and exact description.

Among the principal objects which the present invention has in view are: To provide means for throwing the driving clutch of a Ford automobile when and as the controlled brake is manipulated; to provide an attachment whereby the necessary connections between the brake and clutch levers may be effected in automobiles in service; to provide manually operated means for adjusting the operative relation of the clutch and brake levers; to permit independent operation of the clutch lever; and to simplify and cheapen the construction.

*Drawings.*

Figure 1 is a side view of an automobile engine of the so-called Ford type showing the control foot levers thereof and an attachment such as herein disclosed applied thereto.

Figure 2 is a detailed view on enlarged scale showing the attachment and fragment of the brake and clutch lever.

Figure 3 is a cross section on reduced scale, the section being taken as on the line 3—3 in Figure 2.

Figure 4 is a section taken as on the line 4—4 in Figure 2.

*Description.*

The present invention may be applied to other makes of automobile controlling apparatus but it is especially designed and applicable to control apparatus for Ford automobiles.

As shown in the drawings a pendant link 9 is pivoted by a bolt 10 to a collar 11. The collar 11 is of the clamp collar character and is held in position on the brake lever 12 by the bolt 10 as shown best in Fig. 4 of the drawings.

A hook link 13 is pivotally mounted on the hook bearing end 14 of the slow speed connector 15 with which automobiles of the character mentioned are usually provided.

To receive the bent end 14 of the slow speed connector 15 the clutch lever 16 has a pendant extension 17. It is between the pendant 17 and the retainer cotter pin 18 that the link 13 normally rests. The free ends of the links 9 and 13 are operatively united by a bolt 19, which in service is extended through perforations 20 and 21, in the two levers, respectively. It is obvious that by adjusting the bolt 19 in the various perforations 20 and 21, the operative relation of the two links and the levers with which they are connected may be varied.

To secure a closer adjustment in the operative relation of the brake lever 12 and the clutch lever 16 there is provided a set screw 22. The screw 22 thread-engages a perforation in a lug 23 preferably formed rigidly with and set out from the side of a link 9 in such position that when the screw 22 is set up it rests against the hub of the lever 12.

The effect of the operation of the screw 22 is to swing the free end of the link 9 and through the link 13 move the clutch lever 16 to what may be termed the alert position of the said lever.

It is obvious that the attachment herein described may be quickly and easily installed upon an automobile while in service, it being necessary to only open the clamp 11 and pass the same around the end of the brake lever 12 and to then close the same thereon. To install the link 13, the cotter pin 18 of the slow speed connector 15 is removed and the end of the link 13 is slipped over the hook end 14 of the said connector to rest between the retainer pendant extension 17 and the cotter pin 18. The link 9 is secured over the bolt 10 before the fastening nut 24 thereof is set up. The free ends of the links 9 and 13 are then adjusted and secured by the bolt 19. If a finer adjustment is then required this is accomplished by setting up the screw 22.

With the attachment installed it is obvious that in the operation of the automobile the operator presses upon the brake lever 12, and through the medium of the links 9 and 13 rocks the clutch lever 16 with the result that the clutch is thrown simultaneously with the setting of the brakes.

The advantage of the attachment is obvious, particularly when the engine is slowed down when a light pressure on the brake would otherwise stall the engine.

Claims.

1. An attachment as characterized comprising a link pendant from the brake lever; means operatively connecting said link with the clutch lever of an automobile for moving the same to release the clutch during the movement of said brake lever and prior to the setting of the brakes thereby; and means mounted on said link for adjusting the working position thereof, said means embodying a set screw mounted on said link to bear against the pivot hub of said brake lever for varying the operating position of said link.

2. An attachment as characterized comprising a pendant link pivotally mounted on the brake lever of an automobile to move independent thereof in one direction only; a connecting link pivotally attached to the clutch lever of an automobile removed therewith; and a pivotal connection for the free ends of said links adjustable on said links for varying the operated result thereof.

3. An attachment as characterized comprising a pendant link pivotally mounted on the brake lever of an automobile to move independent thereof in one direction only; a connecting link pivotally attached to the clutch lever of an automobile removed therewith; and a pivotal connection for the free ends of said links adjustable on said links for varying the operated result thereof, said means embodying a series of perforations in each of said links, and a pivot bolt adapted to be passed through said links.

4. An attachment as characterized comprising a link pendent from the brake lever; means operatively connecting said link with the clutch lever of an automobile for moving the same to release the clutch during the movement of said brake lever and prior to the setting of the brakes thereby; and means mounted on said link for adjusting the working position thereof, said means embodying a stop member adjustably mounted on said link for engaging the hub of said brake lever as a fulcrum for said link when operating said clutch lever.

JAMES C. BOYLE.